(12) United States Patent
Iagulli et al.

(10) Patent No.: US 8,114,241 B2
(45) Date of Patent: Feb. 14, 2012

(54) METHOD FOR APPLYING A VACUUM BAG AROUND A FUSELAGE BARREL MADE OF COMPOSITE MATERIAL TO BE POLYMERIZED

(75) Inventors: Gianni Iagulli, San Severo (IT); Pierluigi Cacace, Monteiasi (IT)

(73) Assignee: Alenia Aeronautica S.p.A., Pomigliano D'Arco, Naples (IT)

( * ) Notice: Subject to any disclaimer, the term of this patent is extended or adjusted under 35 U.S.C. 154(b) by 0 days.

(21) Appl. No.: 12/739,932

(22) PCT Filed: Oct. 24, 2008

(86) PCT No.: PCT/IB2008/054394
§ 371 (c)(1),
(2), (4) Date: Apr. 26, 2010

(87) PCT Pub. No.: WO2009/057023
PCT Pub. Date: May 7, 2009

(65) Prior Publication Data
US 2010/0252190 A1    Oct. 7, 2010

(30) Foreign Application Priority Data
Oct. 31, 2007  (IT) .............................. TO2007A0773

(51) Int. Cl.
*B29C 65/00* (2006.01)
*B31B 1/60* (2006.01)
*B32B 37/00* (2006.01)
*G05G 15/00* (2006.01)

(52) U.S. Cl. .......... 156/285; 156/60; 156/381; 156/286; 156/287; 156/382; 156/349

(58) Field of Classification Search .................. 156/285, 156/60, 381, 286, 287, 382, 349
See application file for complete search history.

(56) References Cited

U.S. PATENT DOCUMENTS
6,692,681 B1 * 2/2004 Lunde .......................... 264/510
2006/0108058 A1  5/2006 Chapman et al.

FOREIGN PATENT DOCUMENTS
WO   WO 2008/023293 A2   2/2008
* cited by examiner

*Primary Examiner* — Khanh P Nguyen
*Assistant Examiner* — Matthew Hoover
(74) *Attorney, Agent, or Firm* — Merchant & Gould P.C.

(57) ABSTRACT

A vacuum bag is applied around a fuselage barrel made of composite material to be polymerized, formed by lamination on the outer surface of a mandrel having the form of a solid of rotation about a longitudinal axis. A bag material in the form of a sheet having a transverse width corresponding to the longitudinal length of the fuselage barrel is provided alongside the mandrel. A first transverse end portion of the sheet is fastened or sealed on the outer surface of the barrel or the mandrel. Then the mandrel is rotated around the axis, so as to wrap the sheet about the barrel. While the mandrel rotates, the opposite axial end edges of the sheet are sealed on the mandrel. Finally, a second transverse end portion of the sheet is sealed on the outer surface of the barrel or the mandrel.

14 Claims, 2 Drawing Sheets

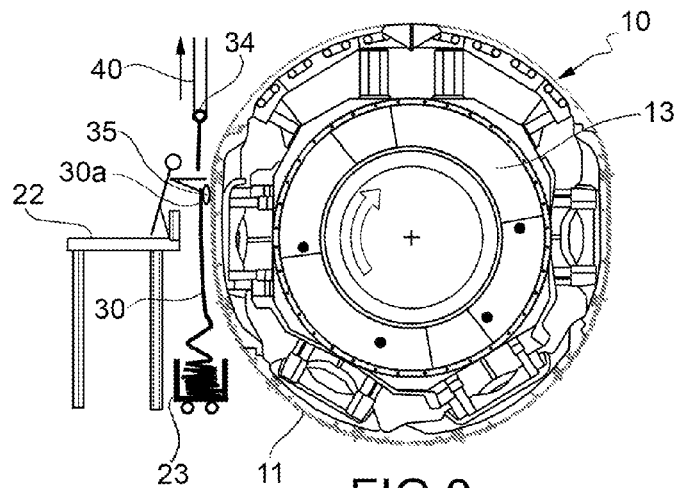
FIG.3
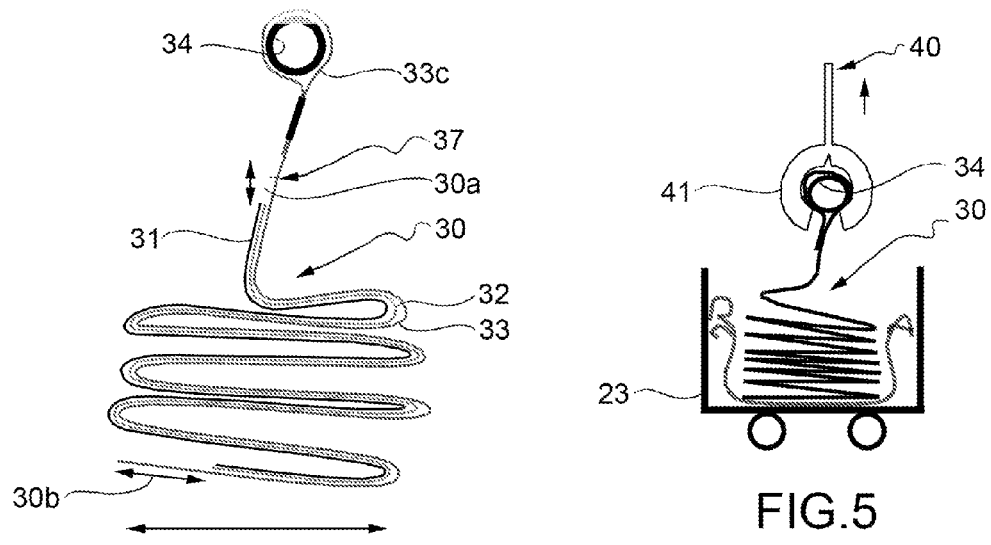
FIG.4
FIG.5
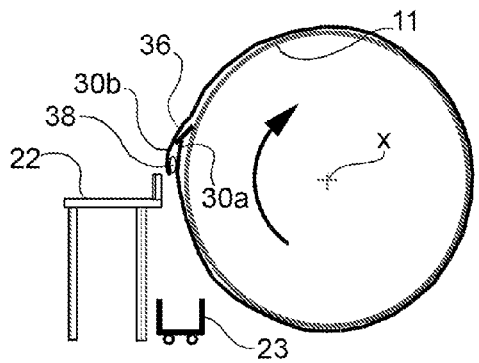
FIG.6
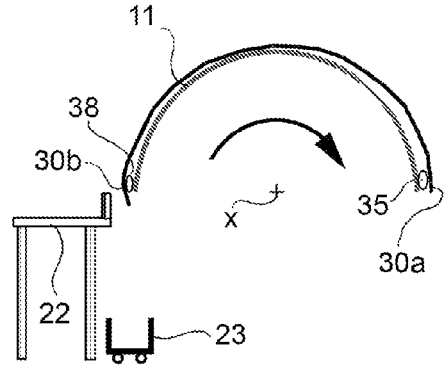
FIG.7

METHOD FOR APPLYING A VACUUM BAG AROUND A FUSELAGE BARREL MADE OF COMPOSITE MATERIAL TO BE POLYMERIZED

This application is a National Stage Application of PCT/M2008/054394, filed 24 Oct. 2008, which claims benefit of Serial No. TO2007A000773, filed 31 Oct. 2007 in Italy and which applications are incorporated herein by reference. To the extent appropriate, a claim of priority is made to each of the above disclosed applications.

FIELD OF THE INVENTION

The present invention relates to the application and sealing of a curing vacuum bag for large structures made of composite material and having surfaces of revolution about an axis, such as fuselage barrels.

BACKGROUND OF THE INVENTION

At present in order to manufacture a large-diameter fuselage section made of laminated composite materials, fibre strips preimpregnated with resin, such as carbon fibres with epoxy resins and graphite with bismaleimide resin, are used. The composite strips are placed automatically by means of one or more supply heads of a special machine on the outer surface of a mandrel having the form of a solid of rotation about a given axis. The supply heads of the machine and the mandrel are moved relative to each other so that the heads apply the strip onto the mandrel following a relative translatory and rotational movement with respect to the axis of the mandrel. The skin of a fuselage section consisting of a composite laminate is thus formed on the outer surface of the mandrel. The whole assembly is then surrounded by a vacuum bag and subjected to a single polymerization cycle inside an autoclave.

Deposition of the vacuum bag constitutes a critical phase in the production process owing to the fact that the bag material is delicate per se and, since it is very big in order to cover a large-size body, there is a considerable risk of it being damaged both during application and during the previous movement and handling stages. A standard vacuum bag used for polymerization of a fuselage section is composed of three separate sheets which are placed in succession on top of one another. A first sheet, consisting of a separating film, is placed in contact with the composite material to be polymerized. A second, porous, so-called breather sheet is arranged in between the film and a third impermeable sheet, generally made of nylon.

Hitherto, in order to apply the vacuum bag onto the fuselage section to be polymerized, the methods which have been employed are such that they result in considerable logistic difficulties as regards handling of the bag material or do not allow precise positioning of the bag. In some cases the bag is lowered from above onto the mandrel using two bridge cranes. In other cases the bag material is pulled and extended manually over the mandrel by operators transported on cage elevators. Often the two end portions of the vacuum bag are joined together manually by an operator who must lie flat on the ground underneath the mandrel.

SUMMARY OF THE INVENTION

One general object of the invention is to optimize the application of a vacuum bag onto a fuselage section to be polymerized and in particular to speed up this process, making it more reliable and industrially competitive. Other specific objects of the invention are to:

ensure that the vacuum bag material remains intact during handling thereof, in order to ensure the vacuum seal;

facilitate correct positioning of the vacuum bag in order to prevent breakages of the bag during pressurization inside the autoclave (for example so-called "bridging" must be avoided);

allow the sealing paths of the bag on the apparatus to be reached by the operators in an ergonomic and safe manner.

A further object of the invention is to provide the vacuum bag material in such a way that the abovementioned objects may be easily achieved.

In summary, according to the invention, the rotation itself of the mandrel about its axis of rotation, which substantially coincides with the axis of revolution of the fuselage barrel to be polymerized which is arranged on the mandrel and must be covered by the vacuum bag, automatically draws from a container the bag material and gradually wraps it around the surface of the barrel. The vacuum bag is gradually applied and sealed around the body.

BRIEF DESCRIPTION OF THE DRAWINGS

A preferred, but non-limiting embodiment of the invention will now be described. Reference is made to the accompanying drawings in which:

FIG. 3 is a schematic front-end view, similar to that of FIG. 2, showing a stage of application of a bag material onto the fuselage barrel;

FIG. 4 shows schematically the bag material according to the invention;

FIG. 5 is a schematic view of removal of the bag material from a carriage; and FIGS. 6 and 7 are schematic views which show application of a bag material for a cylindrical fuselage barrel section and for a semi-cylindrical section, respectively.

DETAILED DESCRIPTION OF THE PREFERRED EMBODIMENTS

Despite the following description which will be provided exclusively with reference to the production of a fuselage or barrel section with an overall cylindrical or semi-cylindrical shape, it is understood that the invention may be used in general for the application of the vacuum bag onto large-size structures made of composite material and having surfaces of revolution about an axis, such as cylindrical or tapered or conical cladding, as required.

Figure 1:
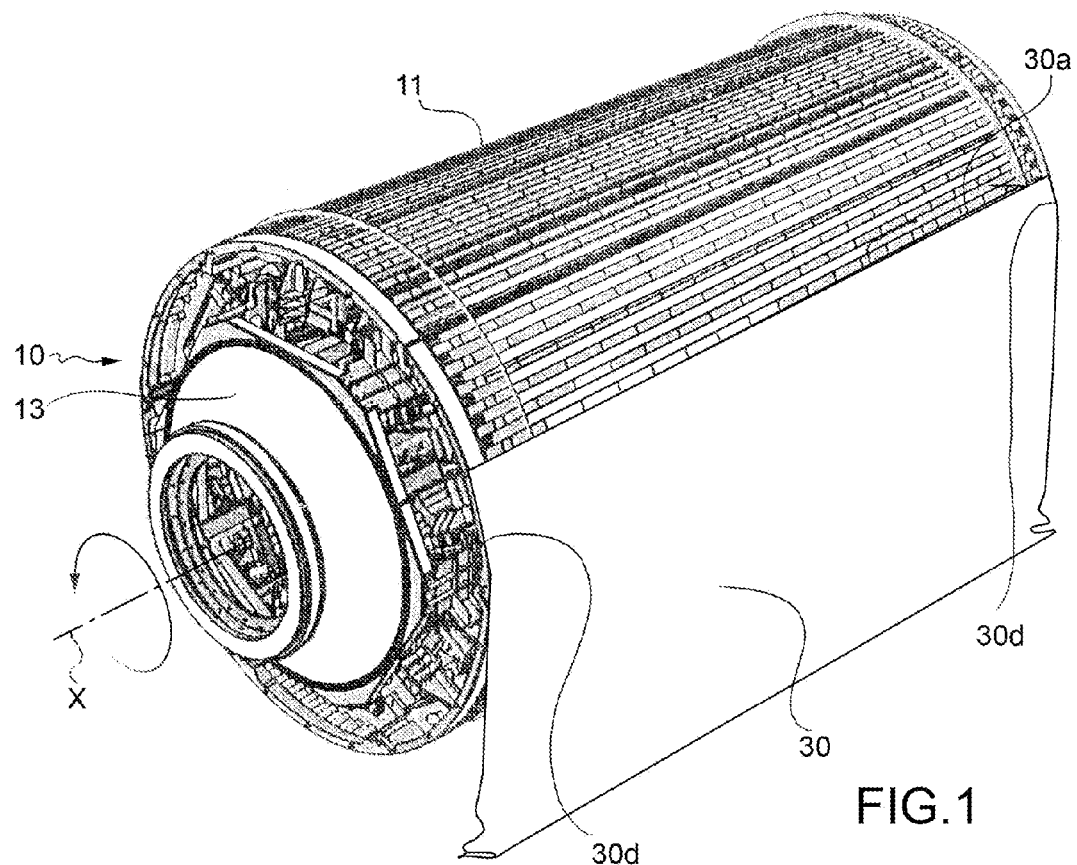
FIG. 1 is a perspective view of a mandrel on the outer surface of which a fuselage barrel made of composite laminate material to be polymerized has been formed.

With reference initially to FIG. 1, 10 denotes a mandrel, the outer surface of which has substantially the form of a solid of rotation about a longitudinal central axis x. In the example shown in the drawings, the outer surface of the mandrel is cylindrical for the production of a middle portion or section of the fuselage of an aircraft. The mandrel 10 is supported at the opposite ends in a rotatable manner about the axis x by means of conical supports 13. In all of the present description and the claims, the terms and the expressions indicating positions and orientations such as "longitudinal" and "axial" are understood as referring to the central axis of rotation x of the mandrel.

Fibre strips preimpregnated with resin are deposited automatically on the outer surface of the mandrel by means of the supply heads of a special machine (not shown) until the skin of a fuselage barrel or section 11 consisting of unpolymerized composite laminate is obtained. The details relating to formation of the laminated barrel are not per se relevant for the purposes of understanding the invention and will therefore not be described. It is sufficient to mention here that deposition of the strips is performed by rotating the mandrel about the axis x and at the same time displacing the strip supply heads in axial directions in synchronism with rotation of the mandrel. The mandrel may be rotated in both directions of rotation by means of two rotary motors 12 (only one of which is shown in FIG. 2) situated at the two opposite ends of the mandrel.

Figure 2:
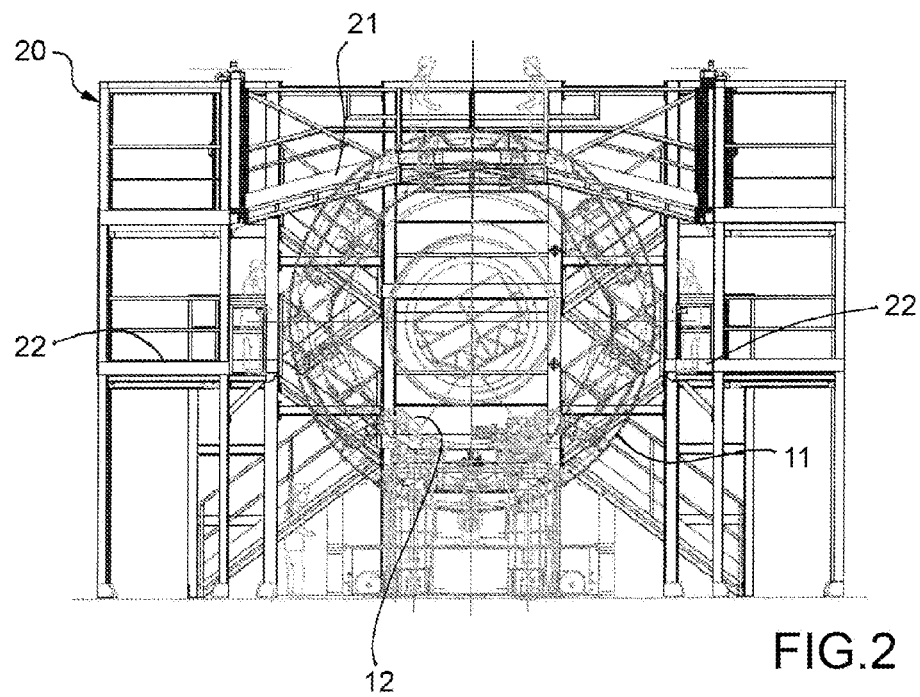
FIG. 2 is a front-end view of the mandrel according to FIG. 1 and a structure for implementing the invention.

In FIG. 2, 20 denotes overall a static support structure similar to a scaffolding arranged around the mandrel. The structure 20 allows the operators to be supported at different heights in order to perform various operations for sealing the vacuum bag around the laminated barrel situated on the mandrel. Alongside each of the axial ends of the mandrel the structure 20 has a respective platform 21 level with the top of the mandrel; along at least one of the two opposite longitudinal sides, the structure 20 has a longitudinal platform 22 at a middle level which is defined here as equatorial. In the example according to FIG. 2, the structure 20 has two opposite and parallel longitudinal platforms which extend alongside the opposite longitudinal sides of the mandrel.

A carriage 23 is arranged alongside the mandrel, said carriage extending in the longitudinal direction and being oriented parallel to the longitudinal axis of the mandrel. The carriage has, arranged inside it, the bag material 30 folded in pleats or rolled up. The material designed to form the vacuum bag is provided in the form of a pre-assembled kit and comprises a single multi-layer sheet suitable for application in a single step, as described further below. The sheet 30 consists of three superimposed layers joined together by means of adhesive or a biadhesive agent. The three layers correspond respectively to the layers conventionally applied in succession on top of one another and include an innermost layer 31 of separating or release film which is suitable for making contact with the composite material to be polymerized, a porous intermediate ventilation or breather layer 32 and an outer nylon layer 33. The width or transverse dimension of the sheet corresponds to the longitudinal dimension or length of the fuselage barrel and the associated mandrel.

The multi-layer bag sheet is then removed from the carriage and unfolded by means of grippers distributed in the longitudinal direction and forming part of a sling 40 or other gripping device which can be raised vertically. In the embodiment shown in FIGS. 4 and 5, the bag sheet is fixed, along an end portion thereof, to a tube 34 which may be stably gripped by a series of grippers 41 which are spaced longitudinally along the tube 34 and raised alongside the mandrel. The raising movement of the sling 40 is independent of the rotational movement of the mandrel.

The mandrel 10 with the associated rotary motors 12 and the composite barrel to be polymerized 11 is arranged alongside or introduced inside the structure 20. Here the sling 40 raises the multi-layer sheet 30 until a first end portion 30*a* of the sheet 30 is positioned level with the equatorial platform. Then the operator attaches the end portion 30*a* to the mandrel, in the example according to FIG. 3 by applying a horizontal strip of sealing mastic 35 along the entire width of the sheet. Then the sheet is cut transversely above the sealing line. Thereafter the rotary motors 12 are activated, thus causing the mandrel to rotate slowly about its longitudinal axis. Owing to rotation of the mandrel, the sheet 30 is removed from the container 23 and is gradually wound around the surface of the barrel 11. During rotation, operators standing on the upper platforms 21 or at the opposite ends of one or both the longitudinal platforms 22 perform gradual sealing of the opposite axial end edges 30*d* of the multi-layer sheet on the mandrel. The slow and continuous rotation of the mandrel continues until complete coverage of the area to be arranged under the bag is performed and will therefore consist in a 360° rotation for closed outer surfaces of revolution (FIG. 6) or a rotation of less than 360° for open surfaces (FIG. 7). Finally the second end portion 30*b* of the multi-layer sheet is sealed by means of application of a transverse strip of sealing mastic 38. Depending the geometrical form of the barrel, the mastic 38 is applied either onto the outer surface of the said sheet already deposited, covering the first end portion 30*a* (FIG. 6) or onto the outer surface of the mandrel (FIG. 7).

With reference again to FIG. 4, in the preferred embodiment of the invention at least one closing end portion 30*b* of the multi-layer sheet consists of the single nylon layer 33 so that, as shown in FIGS. 6 and 7, the sealant acts against this more impermeable layer, ensuring a better air-tight seal. FIG. 6 shows application of the multi-layer vacuum bag around a closed fuselage section, consisting of a cylindrical barrel. Here, sealing of the first end portion 30*a* applied to the composite material may also be performed by simple application of adhesive tape 36 at separate points and then performing final sealing of the second end portion 30*b* by means of the transverse strip of mastic 38, thus achieving sealing between two impermeable layers (nylon on nylon). In order to apply the vacuum bag around an open fuselage section having a semi-cylindrical form as shown in FIG. 7, it is instead preferable to provide a short section of exposed nylon also for the end portion which is applied first against the mandrel. For this purpose the sheet is cut transversely along the line indicated by the arrow 37 in FIG. 4, immediately downstream of a sleeve of nylon alone 33*c* closed around the gripping tube 34 in order to fasten to the latter the end of the sheet to be raised by means of the sling.

As will be appreciated, wrapping of the bag material around the fuselage barrel is performed in an easy, uniform and reliable manner owing to the rotational movement of the said mandrel on which the barrel has been formed in layers. While the mandrel rotates the operators may carefully seal the edges 30*d* at the opposite axial ends of the sheet. During the same rotational movement the operators may check that deposition of the bag material is performed correctly, with the possibility of intervening manually in order to adapt better the bag to the barrel, without assuming awkward or dangerous positions. It has been established during tests that, compared to the prior art, with the method according to the invention, it is possible to halve the overall times for application and sealing of the vacuum bag.

It is understood that the invention is not limited to the embodiments described and illustrated here, which are to be regarded as examples of implementation of the invention, and instead may be subject to modifications relating to forms, dimensions, or structural and functional details. The invention may be used in general for any composite component which has an outer surface similar to that of a solid of revolution about an axis (cylinders, cone sections, paraboloids, ellipsoids, etc.). Finally, it will be appreciated that the invention is applicable also to the manufacture of products different from those mentioned above, such as tanks, silos, rockets, missiles, etc.

The invention claimed is:

1. A method for applying a vacuum bag around a body made of composite material to be polymerized, comprising a fuselage barrel formed by lamination on at least a part of the outer surface of a mandrel having the form of a solid of rotation about a longitudinal axis, the method comprising:
   a) providing, alongside said surface of the mandrel, a bag material in the form of a sheet with a transverse width corresponding to a longitudinal length of the fuselage barrel,
   b) fastening or sealing a first transverse end portion of the sheet onto the outer surface of the barrel or the mandrel,
   c1) rotating the mandrel about said longitudinal axis, to wrap the sheet around the barrel,
   c2) sealing opposite axial end edges of the sheet on the mandrel while the mandrel rotates about said axis, and
   d) sealing a second transverse end portion of the sheet on said outer surface of the barrel or the mandrel.

2. A method according to claim 1, wherein the sheet is a single multi-layer sheet consisting of three superimposed layers: an innermost layer of separating film for making contact with the composite material to be polymerized, an intermediate, porous, breather layer, and an impermeable outer layer.

3. A method according to claim 2, wherein the three layers are joined together by adhesive or a biadhesive agent.

4. A method according to claim 2, wherein at least the second transverse end portion of the sheet consists solely of the impermeable outer layer.

5. A method according to claim 4, wherein the first transverse end portion of the sheet also consists solely of the impermeable outer layer.

6. A method according to claim 1, wherein
   during said steps c1) and c2) the opposite axial end edges of the sheet are sealed gradually while the mandrel rotates to wrap the sheet around the barrel and wherein said steps c1) and c2) are performed simultaneously.

7. A method according to claim 1, wherein the step a) includes:
   providing, adjacent to the mandrel, a static support structure, where the structure comprises at least one longitudinal platform which extends parallel to the outer surface of the mandrel and close thereto, substantially over the entire longitudinal length of the mandrel.

8. A method according to claim 7, wherein the structure comprises two opposite and parallel longitudinal platforms which extend alongside the opposite longitudinal sides of the mandrel, substantially along the entire longitudinal length of the mandrel.

9. A method according to claim 7, wherein at least one longitudinal platform of the structure is situated at a level about halfway along the height of the mandrel to allow an operator to reach manually a middle zone of the outer surface of the fuselage barrel on the mandrel.

10. A method according to claim 7, wherein the structure comprises, alongside each of the axial ends of the mandrel, a respective platform level with the top of the mandrel.

11. A method according to claim 1, wherein said step a) includes:
    providing, alongside the mandrel, a carriage extending in the longitudinal direction and oriented parallel to the longitudinal axis of the mandrel, wherein the carriage contains the sheet folded or rolled up in an orderly manner.

12. A method according to claim 1, wherein the step b) is preceded by the step of:
    raising vertically, by a gripping and raising device which can be operated independently of the mandrel, the first end portion of the sheet to arrange the end portion alongside the outer surface of the barrel at a height close to that of the axis of rotation of the mandrel.

13. A method according to claim 1, wherein the step c) is preceded by:
    cutting transversely the sheet above a sealing or fastening line of the first transverse end portion of the sheet onto the outer surface of the barrel or the mandrel.

14. A method according to claim 1, wherein during the steps c1) and c2) the mandrel is rotated by same operating means used to rotate the mandrel about said axis during the previous step of formation of the barrel by deposition of composite strips on the outer surface of the mandrel.

* * * * *